United States Patent [19]

Wang

[11] 3,814,923

[45] June 4, 1974

[54] ERROR DETECTION SYSTEM

[75] Inventor: Tse Lin Wang, Matawan, N.J.

[73] Assignee: Bell Telephone Laboratories, Incorporated, Murray Hill, N.J.

[22] Filed: Jan. 2, 1973

[21] Appl. No.: 320,461

[52] U.S. Cl. .......................................... 235/153 BD
[51] Int. Cl. .......................................... G06f 11/10
[58] Field of Search .......... 235/153 BD, 153 B, 152; 328/92

[56] References Cited

UNITED STATES PATENTS

| | | | |
|---|---|---|---|
| 3,098,994 | 7/1963 | Brown, Jr. | 235/153 BD |
| 3,624,373 | 11/1971 | Birchall | 235/153 BD |
| 3,699,323 | 12/1970 | Reinheimer | 235/153 BD |

OTHER PUBLICATIONS

Levine, Residue Checking of Connectives AND, OR, Exclusive-OR IBM Technical Disclosure Bulletin, Vol. 15, No. 7, Dec. 1972, pp. 2163-2165.

Sih and Reinheimer, Checking Logical Operations by Residues, IBM Technical Disclosure Bulletin, Vol. 15, No. 7, Dec. 1972, pp. 2325-2327.

*Primary Examiner*—Charles E. Atkinson
*Attorney, Agent, or Firm*—R. A. Ryan

[57] ABSTRACT

The present invention includes circuitry for generating signals corresponding to the predicted residues of logic operations performed in the arithmetic logic unit of a digital processor. In addition, circuitry for generating signals corresponding to the actual residue of the result of a logic operation performed in the arithmetic logic unit and means for comparing the predicted and actual residue signals are provided thereby to check the accuracy of the logic calculations performed in the arithmetic logic unit.

4 Claims, 3 Drawing Figures

ERROR DETECTION SYSTEM

BACKGROUND OF THE INVENTION

1. Field of the Invention

This invention relates to digital signal processors and, more particularly, to the detection of errors in logical operations performed by computing apparatus in such digital signal processors.

2. Description of the Prior Art

The most straightforward error-detecting scheme for ensuring greater accuracy in the processing of digital data simply provides for the duplication of all computational circuitry. Comparison of the results of the calculations performed by the duplicate units verifies the accuracy or inaccuracy of the computations performed in those units. Such redundancy is effective but inefficient and costly.

More sophisticated prior art arrangements implement parity checking codes to expose faults. In accordance with these arrangements, parity is calculated for the data resulting from a particular computation. At the same time, a so-called predicted parity bit or bits are generated from the data being processed and an indication of the type of computation being performed. If the predicted and calculated parity information fail to correspond, an error is indicated. Such parity checking arrangements, although more efficient than those providing duplicated computations, suffer the disadvantage of being capable of detecting only an odd number of errors in a character or byte.

Among the most efficient error-checking arrangements are those which perform checking functions using residue coding schemes. Such arrangements have been used in the prior art principally to detect errors in the arithmetic computations of digital processors. In particular, it is well known that residue representations of natural numbers can be added and, when added according to a truth table, present a residue result which is identical to the residue of the corresponding result of the addition process in the natural number domain. (See *Residue Arithmetic and Its Applications to Computer Technology* by N. S. Szabo et al., McGraw-Hill Book Co., 1967.) The same property applies to the arithmetic operations of subtraction and multiplication. A number of prior art arrangements have capitalized on this property to provide a more economical error-detecting facility for the arithmetic operations of arithmetic logic units in digital processors. In addition, various arithmetic operations have been combined in prior art systems to permit the generation of a predicted residue for the result of a shifting or rotation operation as well as the straightforward arithmetic operations. Typical of these is an arrangement described in an article entitled "Error-Checking Logic for Arithmetic-Type Operations of a Processor" by T. R. N. Rao appearing in the *IEEE Transactions on Computers*, Vol. C- 17, No. 9, Sept. 1968, pp. 845–849.

The useful property of residues described above makes their application to the checking of arithmetic operations particularly efficient. Since the property does not pertain to logical operations, however, residue techniques have not heretofore proven efficient for checking logic computations.

It is therefore a primary object of this invention to provide more economical and efficient error-checking arrangements for digital processors.

It is a more particular object of this invention to provide a residue error-detecting system for detecting errors in the logic-computation facility of a digital processor.

SUMMARY OF THE INVENTION

A set of circuit procedures for predicting the modulo 3 residues of the results of a number of logic operations performable by the arithmetic logic unit (ALU) of a digital processor are specified. The calculations defined by these procedures are performable by simplified, economical circuitry. In addition, the logic operation checking circuitry of the instant invention advantageously utilizes, in part, circuitry typically included in digital processors for forming predicted residues for the results of arithmetic operations performed by the ALU in the processor.

It is, in particular, a feature of the present invention that circuitry is provided for calculating the predicted value of the residue of the result of any of a number of logic operations performable in the ALU of a digital processor.

It is a further feature of the present invention that a portion of the circuitry typically included in arrangements for predicting residues for arithmetic operations is useful also in calculating predicted residues for the results of logic operations.

DESCRIPTION OF THE DRAWING

The foregoing and other objects and features of the present invention will be apparent from the following more particular description of the preferred embodiment of the present invention, as illustrated in the accompanying drawing in which.

DETAILED DESCRIPTION

Figure 1:
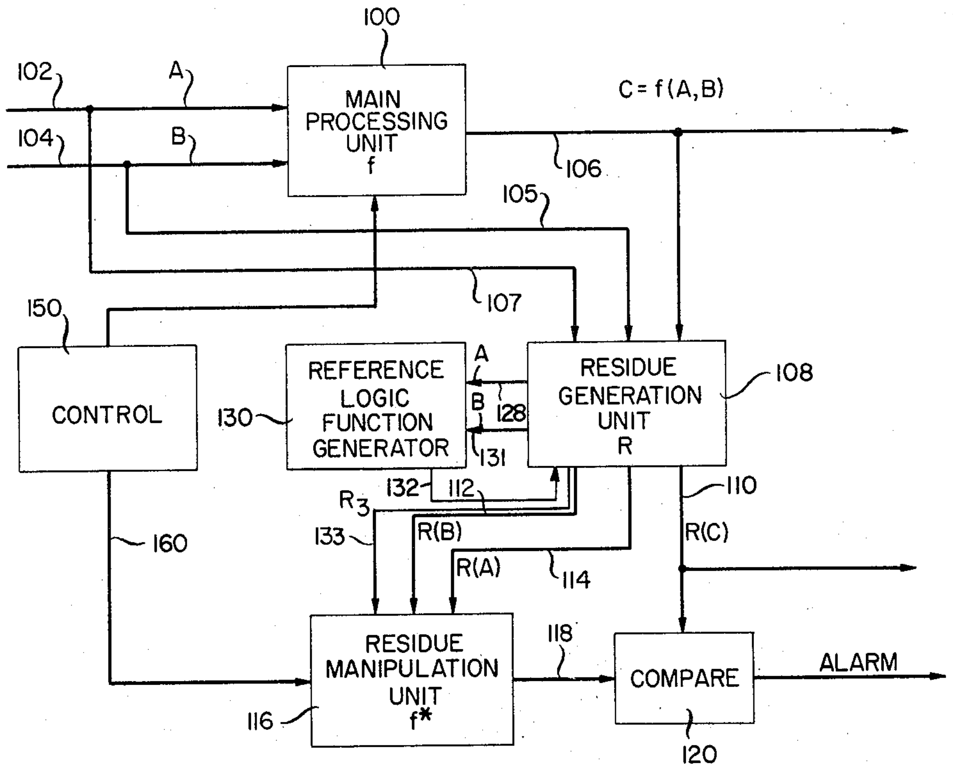
FIG. 1 illustrates, in block diagram form, a residue checking arrangement for a digital processor in accordance with the present invention.

In order to facilitate a better understanding of the present invention, it is considered useful to briefly discuss the residue code used in the binary system. The residue code is a separable code like the parity code; that is, the check bits and the information bits are structurally independent. For example, for a mod M residue code, every n-bit operand A is paired with a k-bit check symbol A*. The numerical value of A* is the least positive modulo M residue of the numerical value of A and will be denoted by $R(A)$. Thus, if $A = a_{n-1} \ldots . a_1 a_0$ and $A^* = a^*_{k-1} \ldots . a^*_1 a^*_0$ then, $$R(A) = \sum_{i=0}^{k-1} a_i^* \, 2^i = \sum_{j=0}^{n-1} a_j \, 2^j \Big|_{\bmod M}.$$

In a typical prior art residue coding arrangement for checking arithmetic operations, the main processing unit in a digital processor performs an arithmetic operation $f$ to combine operands $A$ and $B$ to produce a new operand C. Meanwhile, a residue prediction unit generates a predicted value for $R(C)$, the residue of C, from the residues of $A$ and $B$, $R(A)$, $R(B)$, respectively. The manner in which $R(A)$ and $R(B)$ are combined to produce the predicted $R(C)$ is specified by an arithmetic operation $f^*$ corresponding to $f$. For example, when addition is performed in the main processing unit, then a predicted $R(C) = R(A) + R(B) \mid \text{mod } M$ will be generated in the residue prediction unit. This predicted residue is then compared with the residue evaluated directly from the resulting $C$ produced by the main processing unit. If a mismatch occurs, then an alarm signal will be generated to indicate the existence of an error.

It is useful at this point to note that the merit of a residue code depends on its error-detection efficiency and implementation cost. Specifically, if we choose $$M = 2^k - 1, k > 1$$

then, for any operation for which the residue of the resulting $C = f(A, B)$ is predictable, all burst errors of length $k - 1$ or less will be detected.

If we denote $r(X)$ as the mod $M$ residue of the number $X$, then for $M = 2^k - 1$ we have:

$$r(2^{ki+j}) = (r(2^k))^i\, r(2^j)$$
$$= (1)^i\, r(2^j)$$
$$= r(2^j).$$

Therefore, the mod $M$ residue of the binary number $$A = a_{n-1} \text{ - - - - } a_1 a_0$$

can be evaluated as follows:

$$R(A) = \sum_{i=0}^{n-1} a_i 2^i \mid \text{mod } M$$

$$\sum_{i=0}^{p} \sum_{j=0}^{k-1} a_{ki+j}\, 2^j \mid \text{mod } M$$

where $p$ is the largest integer smaller than $(n-1)/k$ and $a_t = 0$ for all $t \ngtr n$. For example, the mod 3 ($k = 2$) residue of the binary number 1110100100 is $(0 + 1 + 2 + 2 + 3) \mid \text{mod } 3 = 2$.

Thus, the residue of an n-bit binary number can be found by first partitioning the n-bit binary number into $p$ k-bit segments each forming a k-bit binary number, and then combining them by mod 3 summation. The implementation cost is thus significantly reduced as no division or multiplication is required.

As mentioned above, by duplicating the main processing unit in a digital processor, high error-detection efficiency is obtained. In order, then, for a residue code to be useful, it must have an efficiency near that of the duplicating arrangement, while at the same time involving significantly lower implementation cost. As indicated, the mod 3 code proves to have good efficiency and low implementation cost.

Proceeding with the detailed description, FIG. 1 shows a main processing unit 100 which is arranged to perform any of a number of arithmetic and logic operations on the operands A and B applied to main processor 100 via input leads 102 and 104. Main processing unit 100 may, for example, be a GRI-909 function processor manufactured by GRI Computer Corporation, Newton, Mass. A discussion of the operation of this unit can be found in an article entitled "The Direct Function Processor Concept for System Control" by Saul Dinman appearing in *Computer Decisions*, Mar., 1970, pp. 55–60. The output function, C, of main processing unit 100 appears on lead 106.

Also included in the arrangement of FIG. 1 is a residue generating circuit 108 for calculating the modulo 3 residue of functions applied to it. Residue generators are well known in the art. See, for example, *Error Detecting Logic for Digital Computers*, F. F. Sellers, Jr., et al., McGraw-Hill Book Co., 1968, pp. 76–83. Residue generator 108 in FIG. 1 produces the residue of the factor C appearing on lead 106 and channels this residue, $R(C)$, to lead 110. Residue generator 108 is also arranged to generate the residues of the input operands, $A$ and $B$, applied to it via leads 105 and 107. These residues, $R(A)$ and $R(B)$, are channeled to leads 112 and 114, respectively. Residue manipulation unit 116 is arranged to produce the predicted residue of the function $C$ where that function is logical.

To illustrate, consider that main processing unit 100 is arranged to perform the logical AND function on operands $A$ and $B$ such that $C = A \wedge B$, where the AND function is denoted by the symbol $\wedge$. Residue generator unit 108, then, generates the residues of A, B and C. The residues of A and B are applied to residue manipulation unit 116.

In addition, reference logic function generator 130 generates signals corresponding to a specified reference logic operation (to be described more fully below) performed on the signals A and B applied to it via leads 128 and 130. The output of reference generator 131 is applied via lead 132 to residue generator unit 108. The residue R3 of the signal on lead 132 is applied to residue manipulation unit 116 via lead 133 along with the residues of A and B as indicated. Residue manipulation unit 116, under control of control unit 150, then combines the input residue signals in accordance with specified logic relationships to produce a predicted residue which is the same as the residue of the result of the AND operation performed by main processing unit 100 (if the calculations were correctly performed by the main processing unit). Compare circuit 120, of standard design, is arranged to compare the two resulting residues and to produce a signal indicating a mismatch in the event that the two signals do not compare.

At this point, it is deemed useful to consider the rules in accordance with which the residues of A and B are manipulated to produce a residue identical (in the event there are no errors) to the residue of the result of the logical operation performed by main processing unit 100. Thus, consider the entries in Table 1 below.

TABLE 1

| A | B | AVB | A ∧ B | A⊕B |
|---|---|---|---|---|
| 0 | 0 | 0 | 0 | 0 |
| 0 | 1 | 1 | 0 | 1 |
| 1 | 0 | 1 | 0 | 1 |
| 1 | 1 | 1 | 1 | 0 |

In Table 1, V denotes the OR operation, $\wedge$, again, denotes the AND operation and $\oplus$ denotes the Exclusive-OR operation. It is clear from an examination of Table 1 that $$R(A) + R(B) = R(AVB) + R(A \wedge B) \quad (1)$$

and $$R(A) + R(B) + R(AVB) + R(A \oplus B) = 0. \quad (2)$$

Throughout the discussion, the "+" sign is understood to specify mod 3 addition.

In a more rigorous manner, if $A$ and $B$ are two n-bit binary words, such that $A = a_{n-1}\, a_{n-2} \ldots a_1\, a_0$ and $B = b_{n-1}\, b_{n-2} \ldots b_1\, b_0,$ then, $$R(A) + R(B) = R\left[\sum_{i=0}^{n-1} a_i 2^i\right] + R\left[\sum_{j=0}^{n-1} b_j 2^j\right]$$

$$= \sum_{i=0}^{n-1} R(2^i)\ (R(a_i) + R(b_i))\ |\ \text{mod } 3$$

$$= \sum_{i=0}^{n-1} R(2^i)\ (R(a_i V b_i) + R(a_i \Lambda b_i))\ |\ \text{mod } 3$$

$$= \sum_{i=0}^{\overline{n-1}} R(2^i)\ (R(a_i V b_i) + R(a_i \Lambda b_i))\ |\ \text{mod } 3$$

$$= R\left[\sum_{i=0}^{n-1} (a_i V b_i)\ 2^i + \sum_{j=0}^{n-1} (a_j \Lambda b_j)\ 2^j\right]$$

or $R(A) + R(B) = R(AVB) + R(A \Lambda B).$

By a similar analysis, it can be readily shown that $R(A) + R(B) + R(AVB) + R(A \oplus B) = 0.$ In order to derive the algorithms for computing the mod 3 residue of an n-bit word resulting from specified logic operations, consider the following relations:

$$R(\sim A) = \begin{cases} R'(A) & n \text{ even} \\ R'(A) + 1 & n \text{ odd,} \end{cases}$$

$$\text{R(A)} - \text{R(B)}\ |\ \text{mod } 3 = R(A) + \text{R}'(\text{B})\ |\ \text{mod } 3$$

$$R(AVB) + R(A \Lambda B) = R_0 \quad (3)$$

and $$R(AVB) + R(A \oplus \text{B}) + \text{R}_0 = 0 \quad (4)$$

where $R(A) + R(B) = R_0$ and $R'$ is the complement of $R$.

In addition, for a 2-bit residue, $R(X)$, $$R(X) = 3 - R'(X).$$

Rewriting Equations 3 and 4, we have $$R(AVB) = R_0 + R'\ (A \Lambda B) \quad (5)$$

$$R(A \Lambda B) = R_0 + R'(AVB) \quad (6)$$

$$R(A \oplus B) = R'_0 + \text{R}'(AVB). \quad (7)$$

It becomes apparent then from these last three equations that, if any of the functions $R(AVB)$, $R(A \Lambda B)$ or $R(A \oplus B)$ is known, then the others, as well as $R(A \uparrow B)$, $R(A \downarrow B)$ and $R(A \leftrightharpoons B)$, where $\uparrow$ denotes the NAND operation, $\downarrow$ denotes the NOR operation and $\leftrightharpoons$ denotes Equivalence, can be derived. For example, if $$R_1 = R(AVB)$$

is known, then, from equations 6 and 7 above, it is clear that $R(A \Lambda B) = R_0 + R'(AVB) = R_0 + R'_1$ and $R(A \oplus B) = \text{R}'_0 + \text{R}'_1\ (AVB) = R'_0 + \text{R}'_1.$ Further, since all residues have been assumed to be 2-bit binary numbers, it is clear that, $R'(A \Lambda B) = R'_0 + R_1$ and $R'(A \oplus B) = R_0 + R_1.$ Analogously, it is easily verified that $$R(A \uparrow B) = R'(A \Lambda B) + \begin{cases} 0 & n \text{ even} \\ 1 & n \text{ odd} \end{cases}$$

$$R(A \downarrow B) = R'\ \overline{(AVB)} + \begin{cases} 0 & n \text{ even} \\ 1 & n \text{ odd} \end{cases}$$

$$= R_1' + \begin{cases} 0 & n \text{ even} \\ 1 & n \text{ odd} \end{cases}$$

$$R(A \Leftrightarrow B) = R'(A \oplus B) + \begin{cases} 0 & n \text{ even} \\ 1 & n \text{ odd} \end{cases}$$

$$= R_0 + R_1 + \begin{cases} 0 & n \text{ even} \\ 1 & n \text{ odd.} \end{cases}$$

Similarly, i. if $R_2 = R(A \Lambda B)$ is known, then, $R(A \Lambda B) = R_2$ $R(AVB) = R_0 + \text{R}'_2$ $R(A \oplus B) = R'_0 + R'_0 + R_2 = {}_{R0} + \text{R}_2$ $R(A \leftrightharpoons B) = R'_0 + R'_2$ (+1 for odd $n$)

$\text{R}(\text{A} \uparrow \text{B}) = R'_2$ (+1 for odd $n$)

$\text{R}(\text{A} \downarrow \text{B}) = \text{R}'_0 + R_2$ (+1 for odd $n$)

ii. $R_3 = R(A \uparrow B)$ is known:

$R(A \Lambda B) = \text{R}'_3$ (+1 for odd $n$)

$R(AVB) = R_0 + R_3$ (+2 for odd $n$)

$R(A \oplus B) = R_0 + R_3$ (+1 for odd $n$)

$R(A \leftrightharpoons B) = \text{R}'_0 + R_3$ $R(A \uparrow B) = R_3$ $R(A \downarrow B) = R'_0 + R'_3$ (+2 for odd $n$)

iii. $R_4 = R(A \downarrow B)$ is known:

$R(A \Lambda B) = R_0 + R_4$ (+2 for odd $n$)

$R(AVB) = R'_4$ (+1 for odd $n$)

$R(A \oplus B) = R'_0 + R_4$ (+2 for odd $n$)

$R(A \leftrightharpoons B) = R_0 + R'_4$ (+2 for odd $n$)

$\text{R}(\text{A} \uparrow \text{B}) = R'_0 + R'_4$ (+2 for odd n)

$R(A \downarrow B) = R_4.$

Clearly, then, the residue of any of the logic operations OR, AND, Exclusive-OR, Equivalence, NAND, NOR or NOT performed on the operands $A$ and $B$ can be calculated with circuitry for generating $R_0 = R(A) + R(B)$ and $R_1 = R(A \vee B)$, for example. Again, since $R(A) + R(B)$ is typically generated in arrangements producing predicted residues of arithmetic operations, only circuitry for producing the residue $R_1$ need be provided in most applications.

In order to facilitate an understanding of the present invention, the operation of the illustrative embodiment of FIG. 1 will be described by way of example. In particular, the circuit arrangement of FIG. 1 will be described by reference to logic relations (ii) above. Proceeding, then, assuming that the selection of a function to be performed by main processing unit 100 is made under the control of signals provided by a control unit 150, these same signals may be used by residue manipulation unit 116 to perform the manipulations indicated in equation form above. The control unit 150 may, of course, merely be a program store. Alternately, a read-only memory or a sequential logic circuit may be used. While control unit 150 may be a separate unit as shown explicitly in FIG. 1, it may also be realized as an integral part of main processing unit 100. The essential characteristic, therefore, is not what control means is used, but rather, because of the unique relationship between the operations required at main processing unit 100 and residue manipulation unit 116, that the same control signals may be used for both units.

In order to generate the logic functions specified by the relationships (ii) above, it is necessary to generate $R_3$ and $R_0$, only. As noted in the relationships (ii), $R_3 = R(A \uparrow B)$, where $\uparrow$, again, denotes the NAND operation. Consequently, reference logic function generator 130 is arranged to perform the NAND operation. For simplicity, then, reference logic function generator 130 will be referred to as merely NAND gate 130 keeping in mind that this designation refers to the implementation of relationships (ii) only. Thus, NAND gate 130 in FIG. 1 generates signals corresponding to the NAND operation performed on the input signals A and B applied via leads 128 and 131, respectively. The resulting signal is applied via lead 132 to residue generator unit 108.

Figure 2:
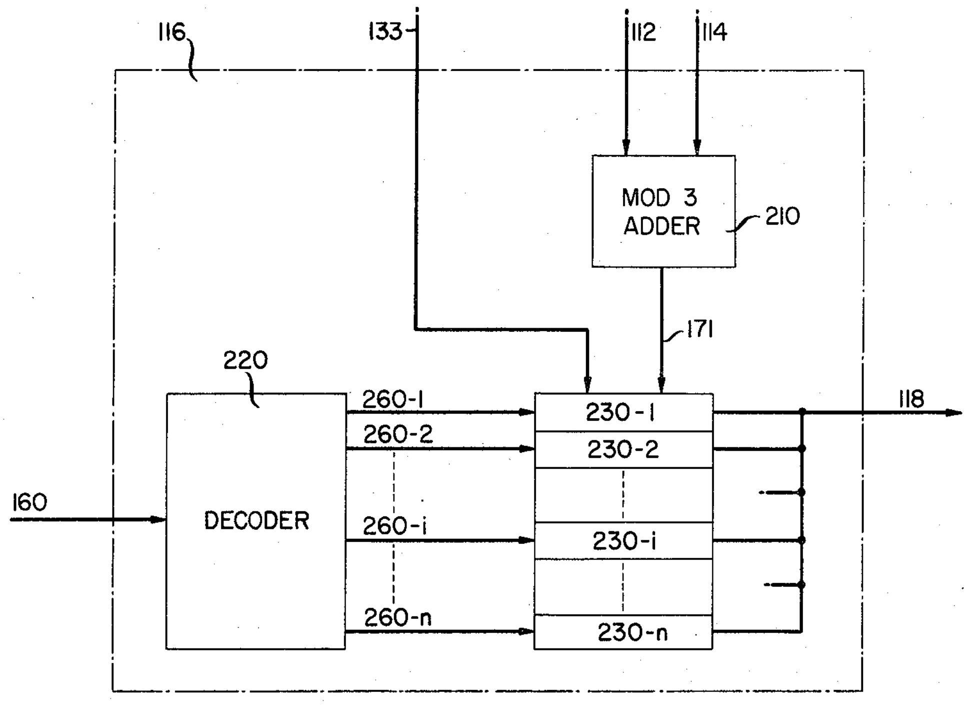
FIG. 2 shows a more detailed block diagram of the residue manipulation circuit of FIG. 1.

In addition, from FIG. 2 it is seen that mod 3 adder 210 generates the function $R_0 = R(A) + R(B)$ from the signals $R(A)$ and $R(B)$ applied to it via leads 114 and 112, respectively.

In turn, the functions $R_0$ and $R_3$ appearing on leads 171 and 133, respectively, are applied to each of the function generator circuits 230–n.

The control signals for residue manipulation unit 116 are applied by way of lead 160 to decoder 220. Decoder 220 then selects in a straightforward fashion the desired one of the function generator circuits 230–n. These latter circuits are, of course, implemented by combining basic logic building blocks in accordance with the equations given above.

Figure 3:
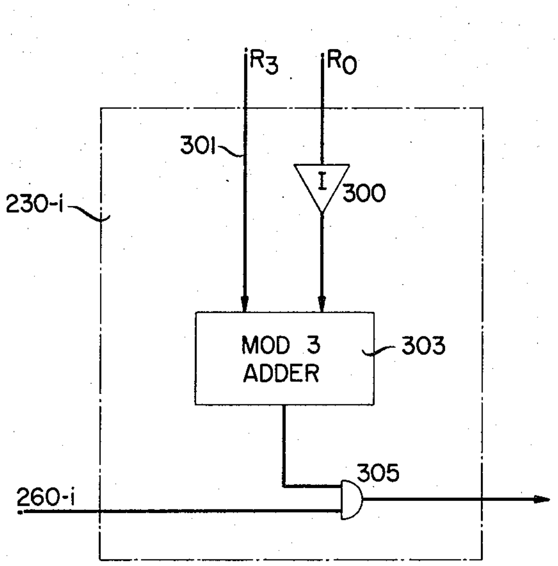
FIG. 3 shows a typical function generator circuit useful in the residue manipulation circuit of FIG. 2.

For instance, if it is desired to generate the function $R(A \leftrightharpoons B)$, the function generator circuit illustratively takes the form shown in FIG. 3. In accordance with the arrangement of FIG. 3, $R_0$ is applied to inverter 300 to produce the function $R'_0$. The output of inverter 300 and the signal on lead 301 are applied to mod 3 adder 303 to produce the function, $R'_0 + R_3$ as desired. The function generator circuit of FIG. 3, designated 230–i is enabled by the decoder 220 via lead 260–i in standard fashion using AND gate 305, as shown.

Of course, as mentioned, the NAND reference function (that associated with logic relations (ii) above) is illustrative only. As is clear from the above discussion any arbitrarily chosen function can as easily be incorporated in the arrangement of FIGS. 1 through 3 as a reference function in accordance with the present invention. Only the details of the function generator circuits 230–n (and, of course, the reference function generator the NAND circuit 130 in the above illustration) will vary as indicated by the logic relations associated with the selected reference function.

Although the present invention has been described in connection with a particular embodiment thereof, it is to be understood that other embodiments and modifications which will be obvious to those skilled in the art are nevertheless included within the spirit and scope of the present invention. In particular, it is apparent that arrangements for calculating modulo 3 residues of logic operations not disclosed herein are well within the skill of the worker in the art in light of the present invention.

What is claimed is:

1. In a data processing system including a first generator circuit for generating output signals in response to control circuitry which output signals represent a selected logic function of first and second input signals, a circuit for checking the operation of said first generator circuit comprising a. means for generating reference logic signals representing a reference logic function of said first and second input signals, b. residue generating means for generating first, second, third and fourth residue signals representing, respectively, the residues of said first and second input signals, the residue of said output signals and the residue of said reference logic signals, c. a residue manipulation circuit responsive to said residue generating means for generating a residue predictor signal, said manipulation circuit comprising 1. adder means for generating signals corresponding to the mod 3 addition function of said first and second residue signals,
2. second generator means responsive to said adder means and said reference logic residue signals for generating a plurality of constituent logic function signals, and
3. means responsive to said control circuitry for selecting one of said constituent logic function signals, and d. means for comparing said selected constituent logic function signal and said third residue signal and for generating a signal when said selected logic function signal and said third residue signal are not identical thereby to signal an error in said selected logic function signal.

2. Apparatus according to claim 1 wherein said second generator circuit comprises a plurality of selectable logic circuits, each arranged to generate one of said constituent logic function signals, and wherein said means for selecting responsive to said control circuitry comprises a decoder responsive to said control signals for generating signals for selecting one or more of said selectable logic circuits.

3. Apparatus according to claim 2 wherein said means for generating reference logic signals comprises an AND gate.

4. Apparatus according to claim 2 wherein said means for generating reference logic signals comprises a NAND gate.

* * * * *